Sept. 10, 1940.         I. SHORT         2,214,485
GEAR LUBRICATION APPARATUS
Filed March 23, 1939         3 Sheets-Sheet 1

WITNESSES:

INVENTOR
IRA SHORT.
BY
ATTORNEY

Sept. 10, 1940.                I. SHORT                    2,214,485
                        GEAR LUBRICATION APPARATUS
                         Filed March 23, 1939         3 Sheets-Sheet 2

INVENTOR
IRA SHORT.
BY
A. B. Ruvin
ATTORNEY

Sept. 10, 1940.   I. SHORT   2,214,485
GEAR LUBRICATION APPARATUS
Filed March 23, 1939   3 Sheets-Sheet 3

INVENTOR
IRA SHORT.
BY
ATTORNEY

Patented Sept. 10, 1940

2,214,485

UNITED STATES PATENT OFFICE 2,214,485

GEAR LUBRICATION APPARATUS

Ira Short, Prospect Park, Pa., assignor to Westinghouse Electric & Manufacturing Company, East Pittsburgh, Pa., a corporation of Pennsylvania Application March 23, 1939, Serial No. 263,606

16 Claims. (Cl. 184—13)

My invention relates to apparatus, for example, toothed gearing, and it has for an object to improve the lubrication thereof.

Heretofore, reduction gears have had the teeth thereof lubricated either by the "splash" system, where the gear wheel teeth dip in the oil, or by the "spray" system, where oil is sprayed on the teeth near the meshing region. The "splash" system is suitable only at low speeds not only on account of the power loss of the teeth dipping into the oil, but more particularly because of the increasing tendency of the oil being thrown off the teeth before reaching the meshing region with increase in gear speed. Acordingly, the "spray" system is usually employed with high speed gears; and, while the method of applying the lubricant is different, the objections to the "splash" system are not altogether overcome, particularly at high speeds. With a high speed gear, the pitch line velocity may be as high as 250 feet per second. Usually the oil pressure in the spray device will not exceed 20 pounds per square inch, and the maximum velocity of oil from the spray nozzle will be less than 50 feet per second. With this difference in pitch line and spray velocities, it is obvious that the spraying of oil into the contacting teeth is impossible, but, on the contrary, the oil will be batted back and forth between the pinion and wheel teeth. Most of the oil will escape and a part will enter between the teeth, some as liquid oil and some as oil spray; and, with a pitch line velocity of 250 feet per second, the latter action occurs in about one-thousandth of a second, with the result that, not only is there power consumption on account thereof, but the teeth are subjected to severe treatment both because of impact and due to the exceedingly short interval of time within which oil may be filmed to the desired degree of thinness on the tooth surfaces. Pitting and erosion of teeth may occur because of this severe impact condition and on account of the very short time within which oil in the form of liquid or large particles may be filmed out by the engaging teeth.

Accordingly, a further object of my invention is to provide an arrangement for circulating about the gears gaseous medium carrying fine lubricant particles in suspension, with the result that the aforementioned objections are overcome.

A further object of my invention is to provide an arrangement for circulating about the gears gaseous medium carrying fine lubricant particles in suspension, together with means for preventing lubricant in liquid or large particle form from engaging the gears.

A further object of my invention is to lubricate suitable parts by means of a stream of gaseous medium carrying lubricant particles in suspension, the stream being directed toward the parts and undergoing a sharp turn adjacent thereto with the result that lubricant particles will be thrown off tangentially to lubricate the parts.

A further object of my invention is to provide, in connection with a pair of meshing gears and the housing therefor, a circuitous passage including the interior of the housing together with means for inducing gaseous medium to flow circuitously in said passage, means being provided in the passage for loading the air entering the housing with fine lubricating oil particles carried in suspension, so that air and lubricant particles being in ambient relation with respect to the teeth will result in deposition of particles thereon to effect lubrication thereof.

A further object of my invention is to provide, in connection with a pair of meshing gears, a casing cooperating with the gears and defining a passage for directing toward the meshing region of the gears a stream of air laden with lubricating particles.

A further object of my invention is to provide one of a pair of meshing gears with an impeller to induce flow of air through a passage defined by the casing for the gears and traversing an oil spray so that the high velocity air may carry along oil particles in suspension, and the passage being so disposed that the air laden with oil particles may be directed to supply particles for lubricating the meshing region of the gears.

These and other objects are effected by my invention as will be apparent from the following description and claims taken in connection with the accompanying drawings, forming a part of this application, in which:

Figure 1:
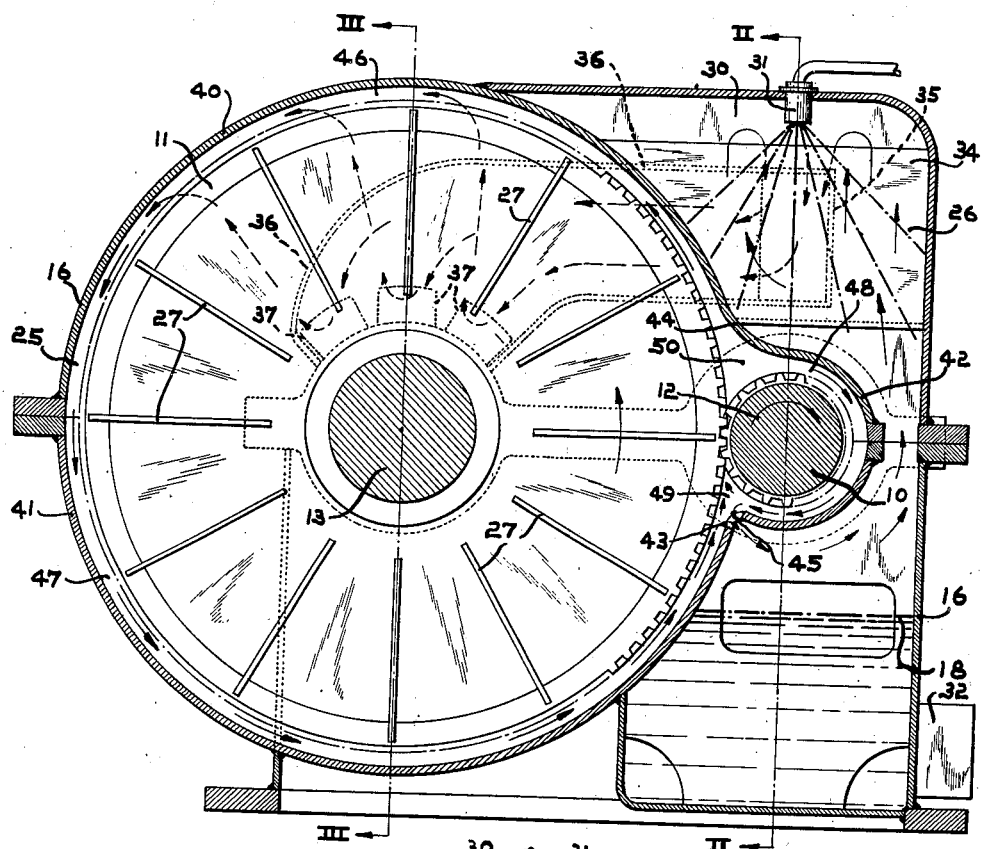
Fig. 1 is an elevational view, partly in section, with the gear wheel shown in side elevation, taken along the line I—I of Fig. 2, and showing one application of my invention as applied to reduction gearing.

In accordance with the present invention, lubrication of suitable parts is effected by fine particles of oil carried by a properly directed air stream. Preferably, the air stream is caused to traverse an oil spray so as to carry along the finer oil particles in suspension and the air stream laden with oil particles is brought into ambient relation with respect to desired parts so that the particles may be effective to lubricate the latter. Where the system is used for lubrication of high-speed gears, for which use it is peculiarly applicable, the casing for the gears is arranged to provide a space in which the teeth travel, and continuous flow of gaseous medium, preferably air, through the space and carrying fine lubricant particles in suspension effects lubrication of the tooth surfaces. Flow through the casing not only provides for lubrication by ambient contact, but the outlet is so disposed as to take advantage of the outgoing velocity to effect tangential separation of oil particles and to direct them toward the meshing region. Circulation of the air or gaseous medium is preferably maintained by impeller means associated with one of the gears. The air circuit passes through a spray device to pick up particles of lubricating oil and then through a separator where oil in liquid or large particle form is removed, whereby the stream is conditioned with fine particles to be brought into contact relation with the gears. Means are provided to guard against any oil, except in fine particle form and carried in suspension by the air. Preferably the casing construction is a self-contained unit arranged to provide for all of these functions, the construction providing a circuitous passage, of which the gear enclosure forms a part, having the spray device and the separator associated therewith and constructed to provide a sump or reservoir from which oil is supplied to the spray device and the bearings.

Referring now to the drawings more in detail, there is shown a pair of meshing gears, for example, a pinion 10 and a gear 11, provided with journals 12 and 13, respectively, fitting bearings 14 carried by the casing 16. The bearings 14 have inlets 17 supplied with lubricant from any suitable source, for example, from the oil reservoir 18 provided in the gear casing. The bearings also have drainage passages 19, 21 and 22 for returning surplus oil to the reservoir 18, the passages 19 serving to prevent passage of oil from the bearings to the toothed surfaces of the gears.

The casing 16 is formed to provide a circuitous air passage through which air is induced to flow at a suitable high velocity, the passage traversing an oil spray in order that high velocity air may pick up and carry along fine oil particles in suspension and being so disposed that the oil particles carried by the air are effective to lubricate the gears. To this end, the casing has compartments 25 and 26 forming parts of said circuitous passage, the compartment 25 closely fitting and enclosing the gears, one of which has centrifugal impeller ribs or vanes 27 to induce flow of air through said passage.

The oil reservoir 18 is preferably provided in the lower portion of the compartment 26 and the upper part of the latter has a spray chamber 30, forming a part of said circuitous passage, within which is located the atomizer or spray device 31, preferably arranged to direct an oil spray counter to the direction of air passing through the chamber, the spray device and the chamber providing for the issuance from the latter of the stream carrying oil particles. Oil in liquid and large particle form gravitates downwardly to the oil reservoir 18. Oil is forced to the spray device 31, as well as to the bearings 14, from the reservoir 18 by any suitable means, for example, by the pump 32.

In addition to the preliminary separation of larger and heavier oil particles due to the atomizer and spray chamber arrangement, the stream issuing from the spray chamber is subjected to further treatment to assure a desired degree of fineness of the oil particles used for lubrication. Accordingly, the stream issuing from the upper end of the spray chamber 30 is compelled to take several direction changes with the result that separation is assisted not only by the change in direction but also by the prolonged path of travel. The stream is compelled to make a reverse turn and flow down through the separators 34 from which it issues laterally through the openings 35 for flow through the passages 36 to the inlet openings 37 of the compartment 25, in order that fine particles carried in suspension by the air may be effective to lubricate the gears.

The compartment 25 is defined by side or end walls 39 and a peripheral wall 40. The peripheral wall has circumferential portions 41, 42 for the respective gears and joined by junction portions 43, 44 at the approach and exit sides, respectively, of the meshing region of the gears. The junction portion 43 has an outlet opening 45. The peripheral wall 40 is spaced relatively close to the tips of the gear teeth and cooperates with the end walls to define a space, at 46, and made up of arcuate spaces 47 and 48 and cusp spaces 49 and 50.

Upon rotation of the gear 11, the ribs 27 function as vanes of a blower, drawing air laden with oil particles into the compartment through the openings 37 and discharging the same into the space 47 at the periphery of said gear. The rapidly moving gear teeth, together with the radially extending ribs 27, will cause the oil-laden air in the space to flow along the peripheral space 47 in the direction of rotation of the gear wheel, and at approximately the speed of the moving teeth. When the rapidly moving air reaches the exit 45 its course in passing therethrough is changed abruptly and, due to the greater density and momentum of the minute particles of oil, the latter are cast off tangentially in the direction of the meshing region of the gear teeth.

In the device, as just disclosed, two factors contribute to effect lubrication. One is the centrifugal action taking place when the oil-laden air, traveling at a high velocity, suddenly changes its direction of flow in leaving the compartment 25 through the exit opening 45, with the oil particles, due to their greater density and momentum, being cast off or separated from the air, to continue into contact with the meshing region of the gear teeth. The other factor is adherence of oil particles to the teeth of the gear due to travel of the latter in the path or current of oil-laden air up to the point of exit of the air from the compartment 25, the adhering particles forming a thin film aiding in lubrication of the meshing teeth.

During the rapid rotation of the gear wheel, some oil particles will be thrown against the inside of the casing and tend to form a film or coating of oil thereon, which film or coating, upon attainment of sufficient depth or thickness, will be carried along the inner peripheral wall 40 of the compartment 25 in the direction of flow of the oil vapor, until it reaches the exit opening 45, through which it is discharged, such discharge, not only being aided by the air, but the latter serving as an effective barrier preventing drops or large particles of oil from the film from reaching the meshing region of the gear teeth. Oil passing through the exit enters the compartment 26 to gravitate to the reservoir 18.

Figure 4:
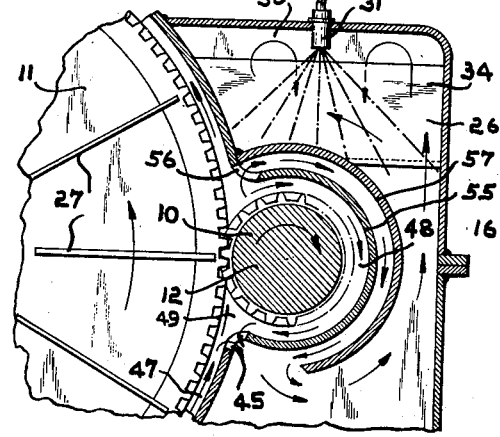
Fig. 4 is an elevational view, partly in section, showing a modification of a portion of the structure shown in Fig. 1; and, Figs. 5 and 6 are sectional views showing further modifications of the invention.
Figure 2:
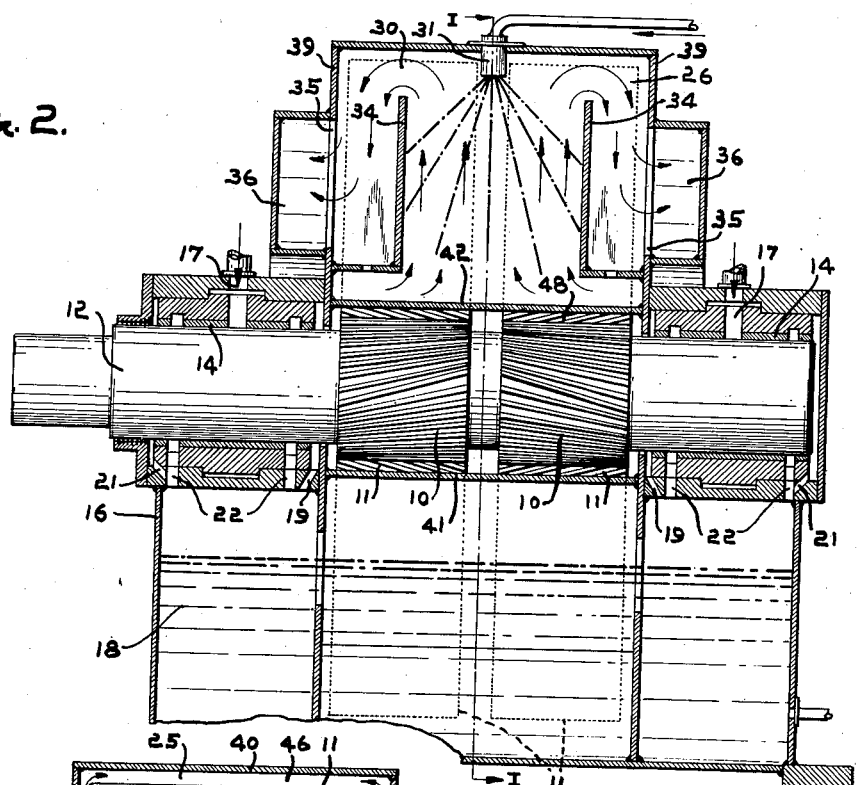
Fig. 2 is a sectional view taken on the line II—II of Fig. 1.
Figure 3:
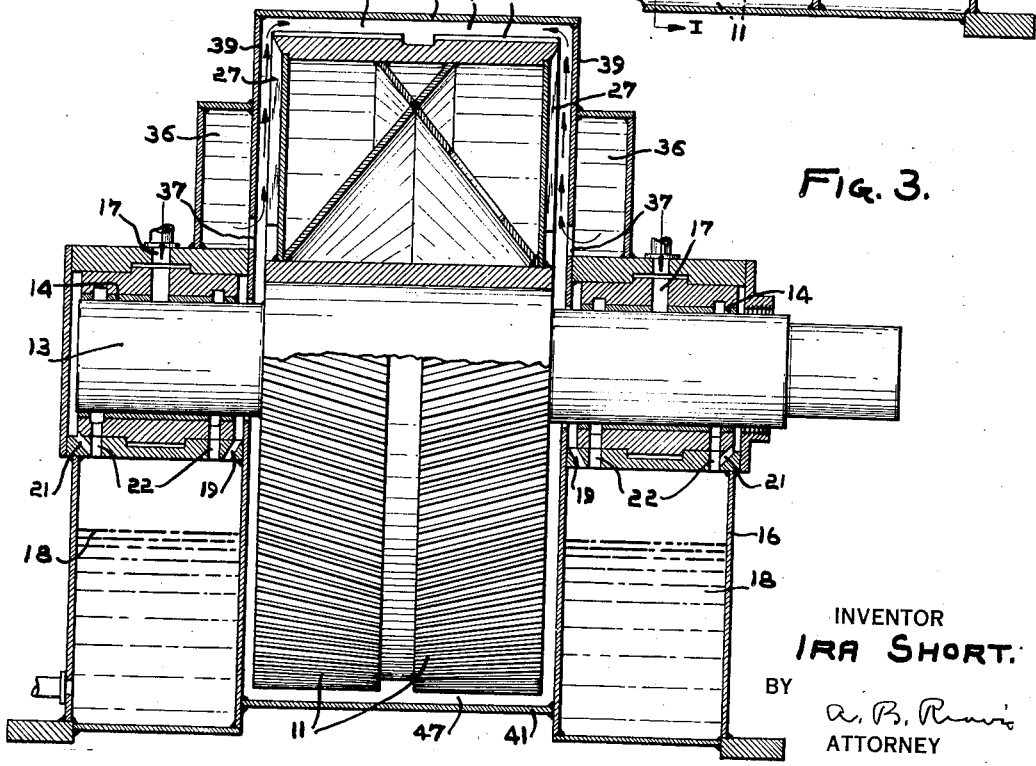
Fig. 3 is a sectional view taken on the line III—III of Fig. 1.

In Fig. 4, there is shown a structure which is modified as regards the exit passage for the air from the compartment 25 to allow for rotation in either direction. In this modification, the pinion housing portion 55 of the septem wall between the compartments has an outlet 56 for exit of air for clockwise rotation of gear wheel, or when the teeth are running together when viewed from above, and an outlet 45 for counterclockwise rotation of gear wheel, or running together of the teeth when viewed from below. To prevent oil from the spray device 31 entering the outlet 56, the latter is shielded by a plate 57.

Figure 5:
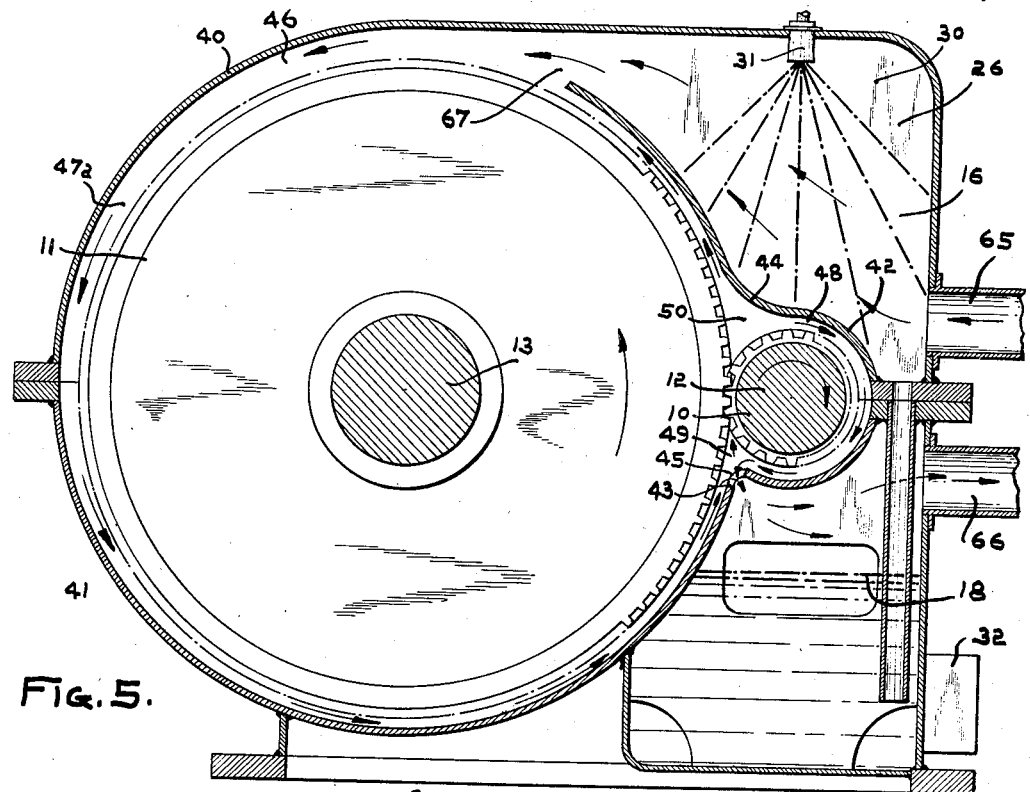

If desired, the blower may be independent of the pinion and gear structure, such an arrangement being shown somewhat diagrammatically in Fig. 5, the vanes 27 being omitted from the sides of the gear, and a separate blower (not shown) being provided exteriorly of the casing 16 and communicating therewith through supply and return ducts 65 and 66, respectively. Preferably, the peripheral passage 47a is volute to provide for gradually increasing velocity.

In operation, air from the blower is delivered through the duct 65 to the compartment 26 where it passes through the spray from the atomizer 31 and via the opening 67 in the septum portion of the wall 41 to the peripheral passage 47a. At the opening 45, the minute oil particles and the air are separated, the former entering between the intermeshing teeth to lubricate the same and the latter passing through the opening 45 and the return duct 66 to the blower.

Figure 6:
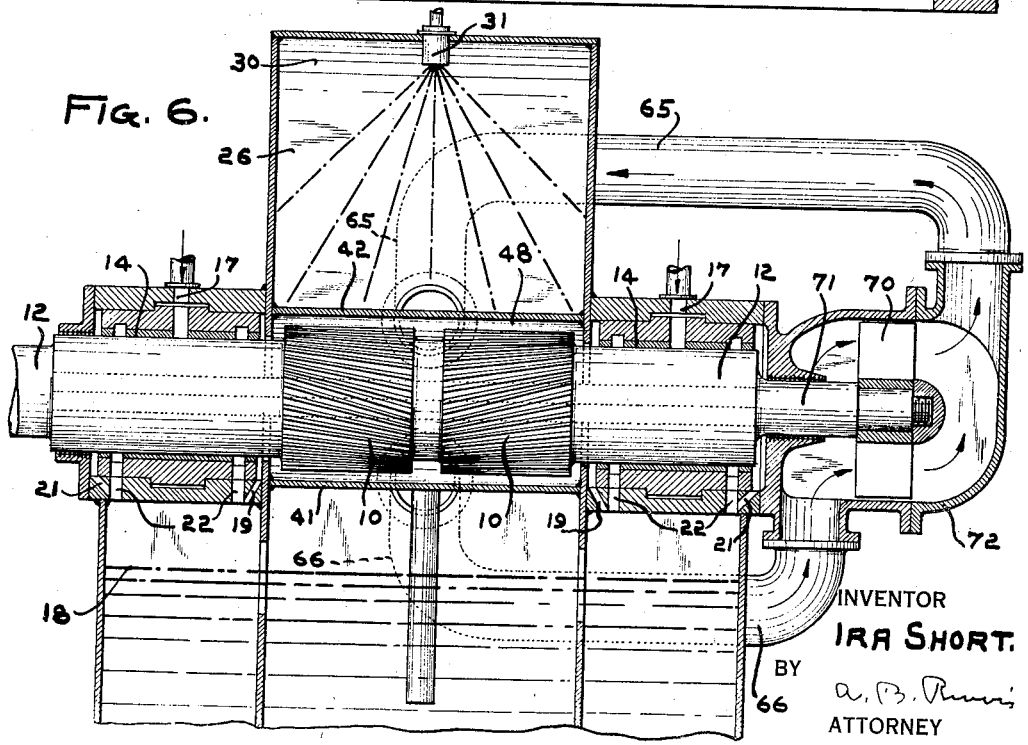

Under certain conditions it may be advantageous to mount the blower directly upon the pinion shaft, in the manner indicated in Fig. 6 where the general arrangement differs from that of Fig. 5 in that the blower 70 is mounted directly upon an extension 71 of the pinion shaft 13. Preferably, the blower 70 is of the propeller type, due to the high pinion speed, and is housed in a casing 72, provided with supply and return ducts 65 and 66, respectively. The operation is the same as described in connection with Fig. 5.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a pair of meshing gears, of means providing a current of gaseous medium carrying lubricant particles in suspension, a casing having bearings for the gears and providing lubricating space encompassing the gears, means providing for flow of said current of gaseous medium and lubricant particles through said lubricating space, and means guarding against the entry of lubricant from the bearings into said space.

2. The combination with a pair of meshing gears, of a casing for the gears providing a circuitous passage for air, said passage including a compartment enclosing and closely confining the gears, means for effecting circulation of an air stream in said circuitous passage, and means for treating the stream with lubricating oil so that the air entering the compartment carries oil particles in suspension.

3. The combination with a pair of meshing gears, of apparatus for lubricating the meshing teeth and comprising means providing a space encompassing and closely confining the gears and in which the teeth travel; means for inducing a stream of gaseous medium to move through said space in ambient relation with respect to the gear teeth; and a device for spraying lubricating oil into the stream before the latter enters said space so that the stream carries along in suspension fine oil particles to lubricate the gear teeth.

4. The combination with a pair of meshing gears, of a casing enclosing the gears, said casing including side walls and a peripheral wall, the peripheral wall having portions extending circumferentially of the respective gears and connected by junction portions, the junction portion adjacent to the approach side of the meshing gears having an outlet opening, said side walls and the peripheral wall defining a space in which the teeth of the gears travel, and means for supplying gaseous medium carrying lubricant particles in suspension to said space.

5. The combination with a pair of meshing gears, of a casing enclosing the gears, said casing including side walls and a peripheral wall, the peripheral wall having portions extending circumferentially of the respective gears and connected by junction portions, the junction portion adjacent to the approach side of the meshing gears having an outlet opening, said side walls and the peripheral wall defining a space in which the teeth of the gears travel, impeller means associated with one of the gears and arranged to discharge into said space, and means for supplying gaseous medium carrying lubricant in suspension to the impeller means.

6. The combination with a pair of meshing gears, of apparatus for lubricating the meshing teeth and comprising means providing a space encompassing and closely confining the gears and in which the teeth travel; means for inducing a stream of gaseous medium to move through said space in ambient relation with respect to the gear teeth; a device for spraying lubricating oil into the stream before the latter enters said space, and means arranged between the spray device and said space for removing oil in liquid and large particle form from the stream.

7. The combination with a pair of meshing gears, of a casing structure provided with an enclosure for the gears and having bearings for the latter; said enclosure having inlet and outlet openings; means providing a circuitous passage including said enclosure and openings; means inducing circulation of gaseous medium in said passage; a device for spraying oil into said passage and arranged between said outlet and inlet openings; a separator in the passage between the spray device and the inlet opening; and means for preventing oil from the spray device and the separator from entering said enclosure.

8. The combination with a pair of meshing gears, of a casing enclosing the gears, having an outlet adjacent to the approach side of the meshing region of the gears, and having an arcuate portion providing a passage directed toward the meshing region; and means providing an air stream flowing in said passage toward the meshing region and undergoing an abrupt change in direction of flow incident to discharge from the outlet; said outlet opening being directed outwardly from the gears so that the air stream in discharging therefrom must undergo a change in direction such that oil particles cast off tangentially are directed toward the meshing region.

9. The combination with a pair of meshing gears having spindles, of a casing for the gears and provided with bearings for the spindles thereof; said casing having an inlet near to the spindle of one of the gears and having a peripheral outlet adjacent to the inlet side of the meshing region of the gears; means providing an air stream entering said inlet, traversing the casing, and undergoing an abrupt change in direction to discharge from said outlet; and means for loading the stream with oil particles carried in suspension so that said abrupt change in direction of the stream may be effective to cast off oil particles tangentially to lubricate the teeth approaching and at the meshing region.

10. The combination with a pair of meshing gears, of a casing structure providing first and second compartments; said first compartment including side walls and a peripheral wall providing a space in which the teeth of the gears travel and the peripheral wall having portions extending circumferentially of the gears and joined by junction portions; one or both of said junction portions having an outlet opening or openings affording communication of said space with said second compartment and the latter extending below the opening or openings to provide a lubricating oil reservoir; a device for spraying lubricating oil into the upper portion of the second compartment; a separator draining into the second compartment; means for inducing a current of air to flow circuitously through the second compartment and its spray device, the separator, said space of the first compartment, and then through said outlet opening to the second compartment; and means for supplying oil from the reservoir to the spray device.

11. The combination with a pair of meshing gears, of a casing enclosing the gears and having a peripheral wall encompassing the latter to provide a lubricating space about the gears and in which the teeth travel; said casing having an inlet communicating with the lubricating space and said peripheral wall having one or more outlets arranged adjacent to the meshing region of the gears; means providing a circuitous passage including said inlet, the lubricating space, and the outlet or outlets; impeller means associated with one of the gears for inducing circulation of air in said circuitous passage; and means between the outlet and the inlet for loading the air stream with minute lubricant particles carried in suspension thereby.

12. The combination with a pair of meshing gears, of a casing enclosing the gears and having a peripheral wall encompassing the gears and defining a lubricating space about the gears and in which the teeth travel; said casing having an inlet and said peripheral wall having outlets arranged adjacent to the meshing region of the gears whereby, regardless of the direction of rotation of the gears, an outlet is provided adjacent the approach side of the meshing region; means providing a circuitous passage including said inlet, the lubricating space, and the outlets; means for effecting air circulation in said passage; and a device for spraying lubricating oil into said passage between the outlets and the inlet and in contact with the moving air in order to provide fine particles of lubricating oil carried in suspension by the air.

13. The combination with a pair of meshing gears, of a casing enclosing the gears, said casing including side walls and a peripheral wall, the peripheral wall having portions extending circumferentially of the respective gears and connected by junction portions, the junction portions having outlet openings, said side walls and the peripheral wall defining a space in which the teeth of the gears travel, means providing a circuitous passage including said space of the casing and said outlet openings, a device for spraying lubricating oil into said passage, means for shielding the openings to prevent the ingress of oil through said outlet openings into said space, and means for inducing flow of gaseous medium in said passage so that medium leaving the spray device and carrying fine particles in suspension is supplied to said space and discharged therefrom through said outlet openings.

14. The combination with a pair of meshing gears, of a casing structure providing first and second compartments; said first compartment including side walls and a peripheral wall providing a space in which the teeth of the gears travel and the peripheral wall having portions extending circumferentially of the gears and joined by junction portions; said junction portion at the approach side of the meshing region of the gears having an opening affording communication of said space with said second compartment and the latter extending below the opening to provide a lubricating oil reservoir; a device for spraying lubricating oil into the upper portion of the second compartment; means for inducing a current of air to flow circuitously through the second compartment and its spray device, said space of the first compartment, and then through said outlet opening to the second compartment; and means for supplying lubricating oil from the reservoir to the spray device.

15. The combination with a pair of gears, of means providing for a stream of air carrying oil particles in suspension moving toward the approach side of the meshing region of the gears and means providing for abrupt deflection of the stream adjacent to the approach side of the meshing region so that oil particles cast off tangentially from the stream incident to change in direction thereof will be directed toward the meshing region.

16. The combination with a pair of meshing gears, of a casing for the gears providing a passage for gaseous medium, said passage including a compartment enclosing and closely confining the gears, means for effecting circulation of a stream of gaseous medium in said passage and including an impeller associated with one of said gears, and means for treating the stream with lubricating oil so that the gaseous medium entering the compartment carries oil particles in suspension.

IRA SHORT.